United States Patent [19]
Purple

[11] 3,759,351
[45] Sept. 18, 1973

[54] FRANGIBLE ENERGY ABSORBING BUMPER MOUNTING DEVICE

[75] Inventor: Edward B. Purple, Joliet, Ill.

[73] Assignee: Nash Bros. Co., Joliet, Ill.

[22] Filed: July 12, 1971

[21] Appl. No.: 161,636

[52] U.S. Cl. .............. 188/1 C, 267/139, 267/162, 293/1, 293/89
[51] Int. Cl. ...... B60r 19/02, B61g 11/16, F16f 7/12
[58] Field of Search .................. 293/1, 85, 86, 89, 293/70, ; 188/1 C; 267/139, 162

[56] References Cited
UNITED STATES PATENTS

| | | | |
|---|---|---|---|
| 3,313,567 | 4/1967 | Sturman | 293/86 X |
| 2,997,325 | 8/1961 | Peterson | 293/1 |
| 2,724,463 | 11/1955 | Becker | 188/1 C |
| 3,209,864 | 10/1965 | Boyd | 188/1 C |
| 3,298,465 | 1/1967 | Stastny | 188/1 C |
| 3,610,609 | 10/1971 | Sobel | 293/1 X |
| 3,671,068 | 6/1972 | Gerhard | 293/1 |

Primary Examiner—Robert G. Sheridan
Assistant Examiner—Howard Beltran
Attorney—Dawson et al.

[57] ABSTRACT

A frangible energy absorbing device particularly suitable for use with automobile bumpers, towing hitches, and the like includes an outer casing having a perimetric side wall and a pair of end plates. An elongated shaft extends slidably through the end plates and carries a thrust plate within the casing which extends generally transversely to the shaft. A plurality of energy absorbing plates such as Belleville washers or longitudinally extending spaced-apart plates are interposed between the thrust plate and the other end plate of the casing. The thrust plate includes a shear pin which extends through an opening in the side wall of the casing and which can withstand forces of normal magnitude applied to the shaft but which shears in the event of impact. When the pin shears, the shaft moves toward the other end plate of the casing to deform the plates, thereby absorbing the energy of impact.

4 Claims, 10 Drawing Figures

Patented Sept. 18, 1973

INVENTOR
EDWARD B. PURPLE

BY Dawson, Tilton,
Fallon & Lungmus
ATTORNEYS

Patented Sept. 18, 1973
3,759,351
2 Sheets-Sheet 2
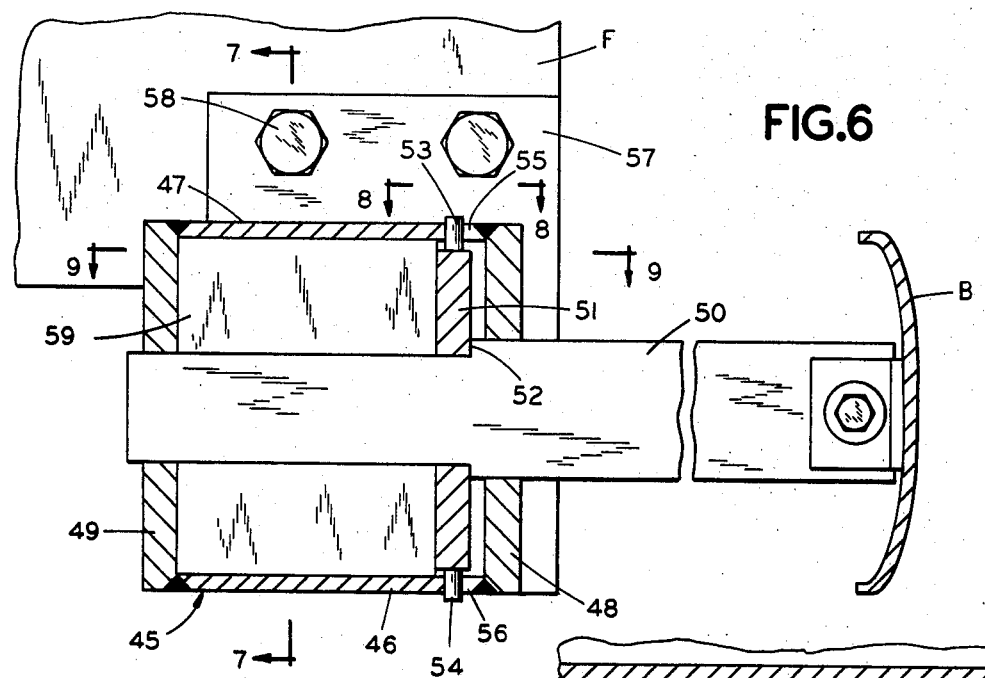
FIG.6
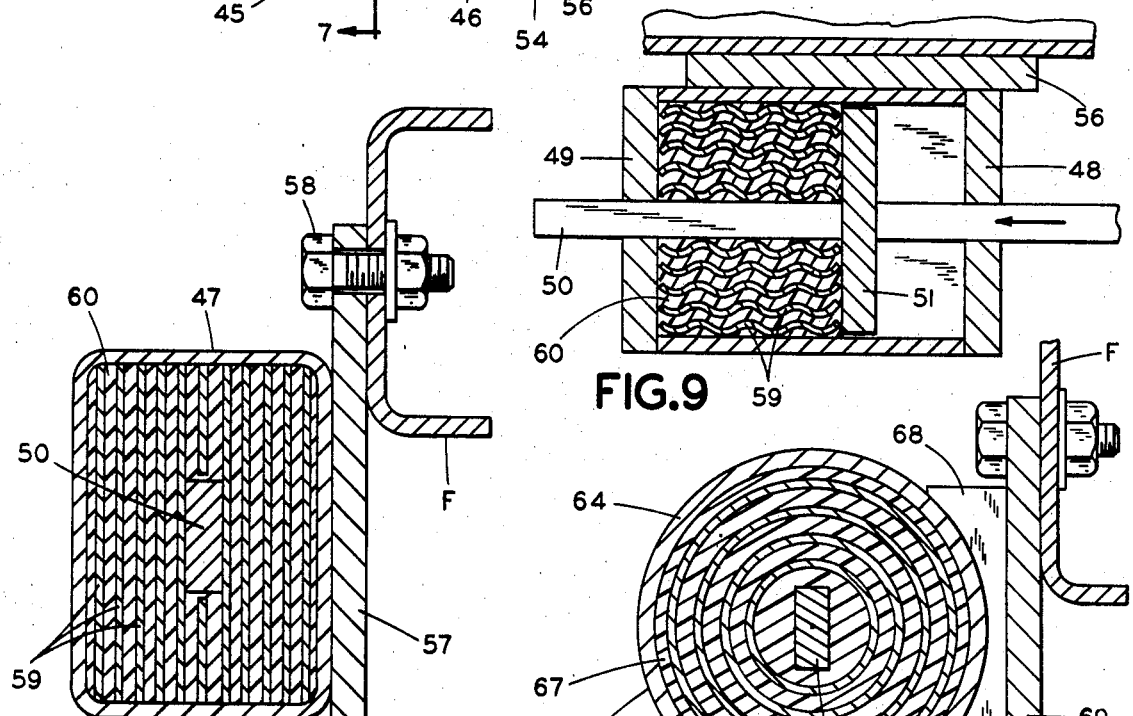
FIG.7
FIG.8
FIG.9
FIG.10
INVENTOR
EDWARD B. PURPLE
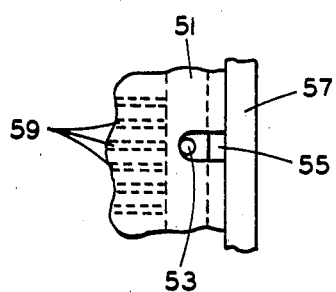
BY
ATTORNEYS

3,759,351

FRANGIBLE ENERGY ABSORBING BUMPER MOUNTING DEVICE

BACKGROUND AND SUMMARY

This invention relates to an energy absorbing device, and more particularly, to an energy absorbing device for use with vehicles.

Vehicle bumpers are generally rigidly mounted to the vehicle frame, and any force applied to the bumper is transmitted to the frame. This may result not only in damage to the vehicle but severe shock to the occupants of the vehicle.

Devices for absorbing the energy of impact have been provided in the past, but many of these devices simply store the energy of impact rather than absorb this energy. Stored energy represents a hazard since damage or injury may occur when the stored energy is released.

It is also desirable that the absorbing device be capable of withstanding normal operating forces which may be encountered by the bumper without causing damage to the absorbing device or requiring any resetting operations or the like.

The inventive absorbing device is provided with shear pins which are capable of withstanding ordinary forces applied to the bumper but which will shear on impact to permit the energy of the impact to be absorbed. The energy is absorbed by deforming the plates interposed between the thrust plate on the shaft and the end of the casing and, since the plates are permanently deformed, no energy is stored for later release. The device is capable of withstanding tension forces and can therefore be used with trailer hitch as well as with a bumper assembly.

DESCRIPTION OF THE DRAWING

The invention will be explained in conjunction with illustrative embodiments shown in the accompanying drawing in which

FIG. 6 is a view similar to FIG. 1 showing another embodiment of the invention;

FIG. 7 is a sectional view taken along the line 7—7 of FIG. 6;

FIG. 8 is a fragmentary top plan view taken along line 8—8 of FIG. 6;

FIG. 9 is a sectional view as would be seen along the line 9—9 of FIG. 6 showing the device absorbing the energy of impact; and FIG. 10 is a front sectional view similar to FIG. 7 showing still another embodiment of the invention.

DESCRIPTION OF SPECIFIC EMBODIMENTS

Figure 1:
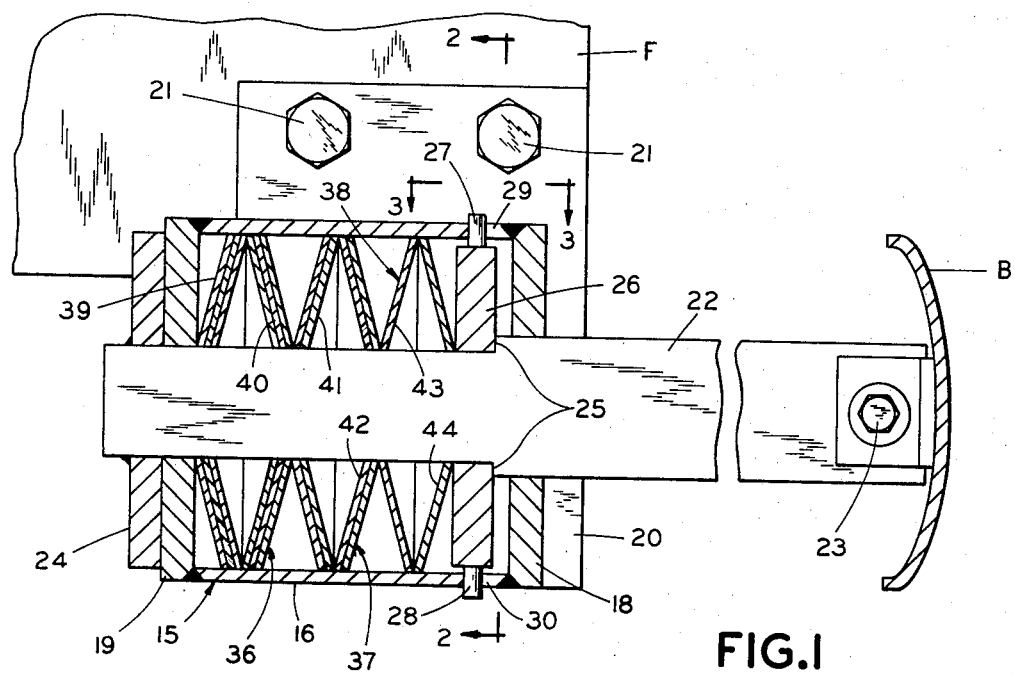
FIG. 1 is a sectional view of one form of the energy absorbing device mounted on a vehicle.
Figure 2:
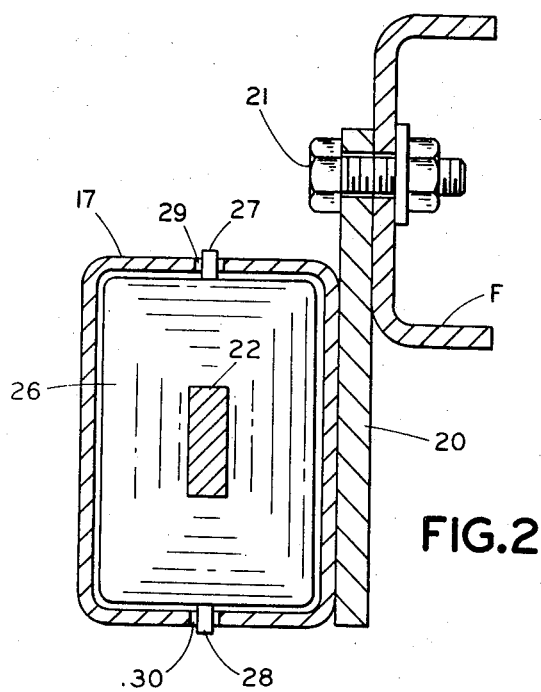
FIG. 2 is a sectional view taken along line 2—2 of FIG. 1.

Referring now to FIGS. 1 and 2, the numeral 15 designates generally an energy absorbing assembly which is mounted on the frame F of a vehicle and which is operatively connected to the vehicle bumper B. The energy absorbing assembly may be used with both the front and rear bumpers, and a pair of assemblies is advantageously used for each bumper, one assembly secured to the frame adjacent each side of the vehicle.

The assembly includes a generally box-like outer casing 16 which is formed by a rectangular extending perimetric side wall 17 and a pair of rectangular end plates 18 and 19 which are welded to the side wall. The casing is secured by any suitable means, such as by welding, to a mounting plate 20 which is in turn secured to the frame by bolts 21.

An elongated shaft 22 which is generally rectangular in cross section extends slidably through correspondingly shaped rectangular openings in the end plates 18 and 19 and is connected to the bumper by bolt 23. The shaft is prevented from sliding to the right as viewed in FIG. 1 by a rectangular stop or abutment plate 24 which is welded to the shaft and which permits the vehicle to be towed by the bumper or adapts the assembly for use with a trailer hitch without causing the shaft to be withdrawn from the casing.

The shaft is necked down just inwardly of the end plate 18 to provide a pair of shoulders 25, and a rectangular thrust plate 26 provided with a central opening corresponding to the cross section of the necked-down portion of the shaft is received on the shaft and abuts the shoulders. Shear pins 27 and 28 extend from the upper and lower sides of the thrust plate, respectively, through slots 29 and 30 provided in the side wall 17 adjacent the end plate 18.

Figures 4, 5:
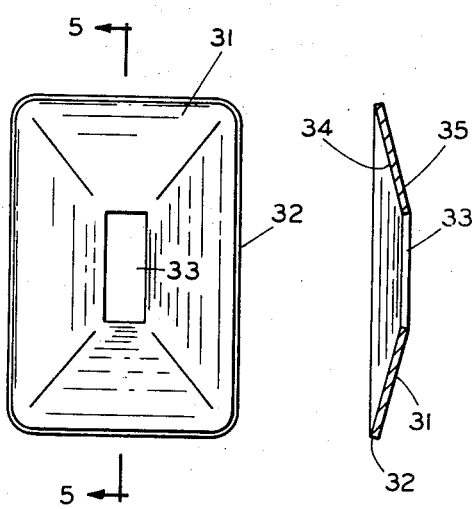
FIG. 4 is an elevational view of one of the energy-absorbing plates shown in FIG. 1.
FIG. 5 is a sectional view taken along line 5—5 of FIG. 4.
Figure 3:
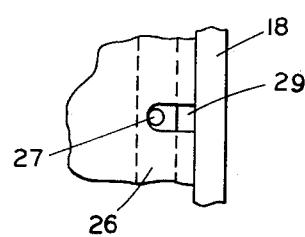
FIG. 3 is a fragmentary top plan view of a portion of the device taken along line 3—3 of FIG. 1.

A plurality of energy absorbing plates are positioned within the casing between the thrust plate 26 and the end plate 19 for absorbing impact energy as the shaft moves from right to left as viewed in FIG. 1. The energy absorbing plates shown in FIG. 1 are generally dish-shaped plates 31 which are commonly called Belleville washers. Referring now to FIGS. 4 and 5, each Belleville washer is seen to have a generally rectangular perimetric edge 32 and is provided with a rectangular central opening 33 which permits the washer to be slidably received on the necked down portion of the shaft 22. The dish shape of the washer provides a generally concave or dished-in side 34 and a generally convex or dished-out side 35.

Referring again to FIG. 1, the washers 31 are arranged in three groups designated generally by the numerals 36, 37 and 38, and each group includes two sets of washers with the concave sides of the washers of each set facing each other. The group 36 includes a first set 39 of three washers nested together with the concave sides thereof all facing the end plate 18 and a second set 40 of three washers nested together with the concave surface thereof facing away from the end plate 18. The group 37 includes two nested sets 41 and 42 of two washers each, the concave surfaces of each set facing toward each other, and the group 38 includes single-washer sets 43 and 44.

The slots 29 and 30 through the side wall of the casing are positioned so that the shear pins engage the end of the slot before the Belleville washers are compressed and serve as lock means for the shaft. The shear pins are sized to withstand ordinary forces which may be encountered by the bumper, such as minor bumps which may be experienced during parking and the like, but will shear when a sufficiently large force is applied to the bumper. The shear pins can be designed to shear upon the application of any predetermined force by varying the thickness of the pins or type of material from which they are made.

When the bumper is impacted with sufficient force to shear the pins, the shaft will move to the left as viewed in FIG. 1 and will begin to compress the washers. The washers are made of mild steel which will permanently deform (i.e., inelastic deformation) as the shaft is forced to the left to absorb the energy of impact. The washers are arranged in progressively larger groups from the two sets of single washers in group 38 to the two sets of three washers in group 36, and the impact energy is absorbed smoothly. The two opposed washers of group 38 will offer the least resistance to deformation, the four opposed washers of group 37 the next least resistance, and the six opposed washers will be comparatively difficult to deform. While such as arrangement produces progressively increasing energy absorption, it will be understood that the number of washers in each set may be varied to produce substantially linear absorption of energy and that the total number of such washers will depend, at least to some extent, upon the weight of the vehicle.

Since the washers are formed of mild steel, they have little tendency to store energy or to spring back after the load on the bumper is removed. Accordingly, the energy of impact is absorbed safely and there is no danger that energy will be stored for later release. However, since impact forces will not act upon the washers unless the shear pins are broken, the washers are maintained in their maximum energy-absorbing condition until a relatively severe impact is experienced.

When a collision of sufficient magnitude has occurred to snap the shear pins, the absorbing assembly can be replaced merely by removing the bolts 21 which attach the assembly to the frame. If the bumper is to be used again, it also can be removed from the assembly by removing the bolt 23.

A modified energy absorbing assembly 45 is illustrated in FIGS. 6–9. The assembly 45 also includes a generally box-like casing 46 which is formed from a rectangular outer side wall 47 and a pair of end plates 48 and 49 welded thereto. Shaft 50 secured to bumper B extends slidably through the end plates 48 and 49 as hereinbefore described, and thrust plate 51 is received on the shaft and abuts the shoulder 52 thereof. Shear pins 53 and 54 extend through slots 55 and 56 in the outer wall of the casing, and the casing is secured to the frame by a mounting plate 57 and bolts 58.

However, the energy absorbing plates 59 are generally rectangular, generally parallel plates which extend between the thrust plate 51 and the end plate 49 generally perpendicularly to the thrust plate and end plates and generally parallel to the longitudinal dimension of the shaft. As can be seen best in FIG. 7, the plates 59 are spaced apart in the transverse direction, and the casing is potted with a filler of hard plastic foam 60, for example, polyurethane, which fills the spaces between the plates 59.

Upon the application of a sufficient force to snap the shear pins, the shaft and thrust plate will move toward the end plate 49 as shown in FIG. 9, and the plates, which may also be made of mild steel, will deform or corrugate. The hard plastic foam between adjacent plates restrains the plates from simple buckling and forces them to corrugate, thereby absorbing a greater amount of energy.

A slightly different form of the energy absorbing unit is shown in FIG. 10. The assembly 62 is similar to the assembly 45 but the casing 63 is provided with a cylindrical outer or side wall 64 and circular end plates. The shaft 65 is substantially the same as the shafts 50 and 22, but the energy absorbing plates 66 are cylindrical rather than planar. The plates 66 are of varying diameters and are arranged concentrically about the center of the shaft 65. The casing is potted with a hard plastic foam 67 which fills the spaces between the plate 66 and which forces the plates to corrugate as described relative to the rectangular energy absorbing plates 59. The casing may be secured to the frame by lugs 68 which are attached to the mounting plate 69. The assembly 62 also includes a generally circular thrust plate (not shown) which is carried by the shaft 65 in the same manner as the plates 51 and 26.

Energy absorbing assembly 15 can also be provided in cylindrical form by providing circular Belleville washers which are received in a cylindrical casing. Accordingly, both energy absorbing devices 15 and 45 can have a circular cross section rather than a rectangular cross section, and either device can include the stop plate 24 to withstand a tension force supplied to the shaft, as when the vehicle is towed.

While in the foregoing specification, detailed descriptions of specific embodiments of the invention has been set forth for the purpose of illustration, it is to be understood that many of the details herein given may be varied considerably by those skilled in the art without departing from the spirit and scope of the invention.

I claim:

1. An impact energy absorbing assembly for a vehicle comprising an outer casing having a side wall and a pair of end plates, an elongated shaft extending slidably through the end plates, a transverse plate within the casing extending generally transversely to the shaft and mounted thereon adjacent one of the casing end plates for movement with the shaft as the shaft moves toward the other casing end plate, a shear pin on the transverse plate extending through an opening in the casing side wall, the shear pin being shearable upon the application of predetermined longitudinal force to the shaft, and a plurality of Belleville washers formed of mild steel and mounted on the shaft between the transverse plate and the other end plate of the casing, the Belleville washers being permanently and inelastically deformable as the shaft and the transverse plate slide toward the other end plate of the casing after shearing of the shear pin whereby the energy of impact on the shaft is absorbed by the inelastic deformation of the Belleville washers.

2. An impact energy absorbing assembly for a vehicle comprising an outer casing having a pair of ends and adapted to be secured to the vehicle, en elongated shaft extending through the casing ends and slidably mounted therein for longitudinal sliding movement, frangible lock means on the shaft engaging the casing for preventing sliding movement of the shaft toward one of the casing ends, the lock means being releasable upon the application of a predetermined longitudinal force to the shaft, and a plurality of Belleville washers formed of mild steel interposed between the lock means and said one casing end, the shaft extending through the Belleville washers, the plates being permanently and inelastically deformable as the shaft slides toward the one casing end whereby the energy of impact on the shaft is absorbed by the inelastic deformation of the plates when the lock means is released.

3. An impact energy absorbing assembly for a vehicle comprising an outer casing having a side wall and a pair of end plates, an elongated shaft extending slidably through the casing end plates, a transverse plate within the casing extending generally transversely to the shaft and mounted thereon adjacent one of the casing end plates for movement with the shaft as the shaft moves toward the other casing end plate, a shear pin on the transverse plate extending through an opening in the casing side wall, the shear pin bearing shearable upon the application of predetermined longitudinal force to the shaft, and a plurality of parallel spaced-apart plates within the casing extending generally transversely to the casing end plates and generally parallel to the longitudinal dimension of the shaft between the transverse plate and the other end plate of the casing, and hard plastic foam filler material filling the space between the spaced-apart plates, the spaced-apart being permanently and inelastically deformable as the shaft and transverse plate slide toward the other casing end plate after shearing of the shear pin and being substantially prevented from buckling by the filler material whereby the energy of impact on the shaft is absorbed by the inelastic deformation of the plates.

4. An impact energy absorbing assembly for a vehicle comprising an outer casing having a side wall and a pair of end plates, an elongated shaft extending slidably through the casing end plates, a transverse plate within the casing extending generally transversely to the shaft and mounted thereon adjacent one of the casing end plates for movement with the shaft as the shaft moves toward the other casing end plate, a shear pin on the transverse plate extending through an opening in the casing side wall, the shear pin being shearable upon the application of predetermined longitudinal force to the shaft, and a plurality of spaced-apart metal cylinders concentrically arranged about the shaft between the transverse plate and the other end plate of the casing, and hard plastic foam filler material filling the space between the spaced-apart cylinders, the spaced-apart cylinders being permanently and inelastically deformable as the shaft and transverse plate slide toward the other casing end plate after shearing of the shear pin and being substantially prevented from buckling by the filler material whereby the energy of impact on the shaft is absorbed by the inelastic deformation of the cylinders.

* * * * *